US010696344B2

(12) United States Patent
Augustin et al.

(10) Patent No.: US 10,696,344 B2
(45) Date of Patent: Jun. 30, 2020

(54) SCOOTER DRIVEN BY AN ELECTRIC MOTOR FOR TRANSPORTING PERSONS AND METHOD FOR OPERATING A SCOOTER

(71) Applicant: Bayerische Motoren Werke Aktiengesellschaft, Munich (DE)

(72) Inventors: Stephan Augustin, Munich (DE); Rainer Daude, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/298,908

(22) Filed: Mar. 11, 2019

(65) Prior Publication Data

US 2019/0202518 A1 Jul. 4, 2019

Related U.S. Application Data

(63) Continuation of application No. PCT/EP2018/070794, filed on Jul. 31, 2018.

(30) Foreign Application Priority Data

Oct. 18, 2017 (DE) .................. 10 2017 218 568
Oct. 18, 2017 (DE) .................. 20 2017 006 790 U

(51) Int. Cl.
*B62K 21/00* (2006.01)
*B62K 17/00* (2006.01)
(Continued)

(52) U.S. Cl.
CPC ............... *B62K 5/007* (2013.01); *B62H 1/12* (2013.01); *B62K 3/00* (2013.01); *B62K 3/002* (2013.01);
(Continued)

(58) Field of Classification Search
CPC ...... B62K 5/007; B62K 17/00; B62K 15/006; B62K 21/12; B62K 2202/00; B62K 2204/00; B62K 2208/00
See application file for complete search history.

(56) References Cited

U.S. PATENT DOCUMENTS 3,289,780 A 12/1966 Ferris
3,416,625 A 12/1968 Narutani
(Continued)

FOREIGN PATENT DOCUMENTS

CN 102050182 A 5/2011
CN 104471269 A 3/2015
(Continued)

OTHER PUBLICATIONS

International Search Report (PCT/ISA/210) issued in PCT Application No. PCT/EP2018/070794 dated Nov. 6, 2018 (five (5) pages).
(Continued)

*Primary Examiner* — Bryan A Evans
(74) *Attorney, Agent, or Firm* — Crowell & Moring LLP

(57) ABSTRACT

A scooter, which is driven by an electric motor, for transporting persons, includes an electric drive motor and a standing platform. A front wheel is arranged along a center axis of the standing platform. A steering rod is coupled to the front wheel. Handlebars pivot the front wheel about a rotational axis, which is formed by the steering rod. Two rear wheels are at a spacing from the front wheel and are each arranged laterally offset with respect to the center axis. A feed-through aperture, which is preferably completely closed circumferentially and is passed through by the steering rod, or in which the front wheel sits, is incorporated into the standing platform. The front wheel is flanked on both (Continued)

sides in each case by at least one support element which projects from an underside of the standing platform that faces an underlying surface.

9 Claims, 4 Drawing Sheets

(51) Int. Cl.
    *B62K 5/007*     (2013.01)
    *B62K 3/00*     (2006.01)
    *B62K 5/00*     (2013.01)
    *B62K 7/04*     (2006.01)
    *B62M 7/12*     (2006.01)
    *B62H 1/12*     (2006.01)
    *B62J 43/00*     (2020.01)
    *B62K 15/00*     (2006.01)
    *B62K 21/12*     (2006.01)

(52) U.S. Cl.
    CPC .................. *B62K 5/00* (2013.01); *B62K 7/04* (2013.01); *B62K 17/00* (2013.01); *B62K 21/00* (2013.01); *B62M 7/12* (2013.01); *B62J 43/00* (2020.02); *B62K 15/006* (2013.01); *B62K 21/12* (2013.01); *B62K 2202/00* (2013.01); *B62K 2204/00* (2013.01)

(56) References Cited

U.S. PATENT DOCUMENTS

| | | |
|---|---|---|
| 3,566,985 A | 3/1971 | Triplett |
| 6,095,267 A | 8/2000 | Goodman |
| 6,390,216 B1 | 5/2002 | Sueshige et al. |
| 2002/0003055 A1 | 1/2002 | Leitner et al. |
| 2002/0005309 A1 | 1/2002 | Patmont et al. |
| 2004/0070365 A1 | 4/2004 | Chiu |
| 2005/0139410 A1 | 6/2005 | Fan |
| 2007/0063502 A1* | 3/2007 | Greig .................... B62K 5/025 280/771 |
| 2014/0305720 A1 | 10/2014 | Chan |
| 2015/0166138 A1 | 6/2015 | Lovley, II et al. |
| 2019/0168835 A1* | 6/2019 | Hernandez ................ B62J 1/14 |

FOREIGN PATENT DOCUMENTS

| | | |
|---|---|---|
| CN | 106828736 A | 6/2017 |
| DE | 1 923 341 A1 | 11/1969 |
| DE | 202 15 643 U1 | 1/2003 |
| GB | 477411 A | 12/1937 |
| GB | 704317 A | 2/1954 |
| GB | 2 219 559 A | 12/1989 |
| GB | 2 406 315 A | 3/2005 |
| GB | 2491136 A | 11/2012 |
| WO | WO 2007/027502 A2 | 3/2007 |

OTHER PUBLICATIONS

German-language Written Opinion (PCT/ISA/237) issued in PCT Application No. PCT/EP2018/070794 dated Nov. 6, 2018 (six (6) pages).
German-language Search Report issued in counterpart German Application No. 10 2017 218 568.6 dated Aug. 22, 2018 with partial English translation (13 pages).
Chinese Office Action issued in Chinese application No. 201811211683.X dated Jan. 22, 2020, with English translation (Sixteen (16) pages).

* cited by examiner

SCOOTER DRIVEN BY AN ELECTRIC MOTOR FOR TRANSPORTING PERSONS AND METHOD FOR OPERATING A SCOOTER

CROSS REFERENCE TO RELATED APPLICATIONS

This application is a continuation of PCT International Application No. PCT/EP2018/070794, filed Jul. 31, 2018, which claims priority under 35 U.S.C. § 119 from German Patent Application No. 10 2017 218 568.6, filed Oct. 18, 2017, the entire disclosures of which are herein expressly incorporated by reference.

BACKGROUND AND SUMMARY OF THE INVENTION

The invention relates to a scooter, which is driven by an electric motor, for transporting persons, having an electric drive motor and a standing platform. The invention additionally relates to a method for operating such a scooter.

Scooters of the type mentioned above are comparatively simple transport means which are simultaneously compatible with obstacles and crowds of people. Such scooters are utilized, in particular, on level, compacted surfaces for the movement or for the transport of persons, and comprise, as a rule, two or three wheels. On account of the simple handling and flexible applications and the comparatively small space requirement, such scooters are frequently used to transport persons in extensive grounds or building complexes, such as, for example, in a factory hall or an airport, to reduce walking times.

In the case of such scooters, a user stands upright while traveling, as a rule, on a standing surface of a standing platform which is oriented parallel to an underlying surface. In this connection, the standing platform is arranged, as a rule, in a flat manner. This means that the standing platform is only at a small distance from the underlying surface. As a result, on account of the upright user, when in use the scooter has a comparatively high center of gravity, which is arranged, as a rule, above the standing platform. Consequently, there is a certain tilt risk and consequently accident risk when the scooter is in use.

US 2002/005309 A1 discloses an electromotive scooter having a free-standing, steerable front wheel and having a rear wheel which is driven by an electric motor. Such a two-wheeled scooter, however, has a reduced standing surface and a comparatively high tilt risk. As a result, when such a scooter is used in factory halls or airports, there is an increased accident risk in the case of obstacles such as rails or thresholds.

US 2015/0166138 A1 discloses an electromotive scooter having two free-standing, steerable front wheels which are driven by an electric motor and one rear wheel. Such three-wheeled arrangements, however, disadvantageously have a tendency to tip up when traveling around tight bends and when driving on inclined surfaces and consequently have an increased accident risk.

U.S. Pat. No. 6,390,216 B1 describes an electromotive scooter having a free-standing, steerable front wheel and two rear wheels which are driven by an electric motor. A standing platform is provided as a narrow standing surface for a user between the rear wheels. A holder for a golf bag is provided between the standing surface and the handlebars of the front wheel. As a result, the disclosed scooter only has a small standing area for the user.

The object underlying the invention is to provide a particularly suitable electromotive scooter. In particular, a particularly tilt-resistant and operationally safe scooter is to be provided which is suitable, in particular, for use in an extensive building complex or grounds for reducing walking times. The object underlying the invention is also to provide a suitable method for operating such a scooter.

The scooter according to the invention which is driven by an electric motor is suitable and set up for transporting persons, in particular in an extensive building complex or over extensive grounds.

The scooter includes an electric drive motor and a standing platform. The standing platform is arranged approximately parallel to an underlying surface and has an underside, which is oriented toward the underlying surface, and an upper side which is arranged opposite said underside. The upper side, in this connection, is realized in an expedient manner as a standing surface for a user. The standing surface includes, for example, means for improved stability, such as, for example, a mat-like rubber profile or the like.

A steerable front wheel is arranged along a center axis of the standing platform. The front wheel is coupled with a steering rod (steering column) with handlebars, and by way of said handlebars is pivotable about a rotational axis which is formed by the steering rod. For coupling the steering rod with the front wheel, the steering rod includes in a suitable manner a wheel fork which is preferably provided with damping or suspension for improving ground contact and user comfort.

Two rear wheels, which are each offset laterally with respect to the center axis, are arranged on the standing platform at a spacing from the front wheel. The front wheel and the rear wheels, in this connection, form in a suitable manner the corners of an isosceles triangle, the center axis forming the axis of symmetry.

A feed-through aperture, which is preferably completely closed circumferentially, is incorporated into the standing platform. The feed-through aperture, in this connection, is incorporated into the standing platform for example as a circular, hole-like recess. When the scooter is in use, the feed-through aperture is passed through by the steering rod, or the front wheel sits in the feed-through aperture.

The front wheel is flanked on both sides in each case by at least one support element. The (or each) support element projects, in this connection, from the underside of the standing platform in an approximately perpendicular manner.

In contrast to the prior art, the front wheel or the steering rod is not arranged in a free-standing manner on the standing platform but is incorporated in particular at least in part into the standing platform. The central front wheel or the steering rod is protected by the surrounding standing plate by way of the feed-through aperture such that, in the event of a collision with an obstacle, the forces emerging do not act on the front wheel and/or the steering rod. In other words, the forces act in particular on a front edge of the standing platform in the event of a collision with an obstacle. As a result, the stability of a user in the event of an impact is improved such that particularly safe operation of the scooter is ensured.

The front wheel and the two rear wheels carry the standing platform and, when the scooter is in use, are situated substantially in physical contact with the underlying surface at every point in time of the journey. In an expedient manner, the axial height of the support elements on the underside is shorter compared to that of the front and rear wheels. In other words, when the scooter travels upright over a level underlying surface, the support elements do not contact the underlying surface. This means that the support elements are arranged substantially at a clear distance from the underlying surface. If a certain degree of lateral inclination of the standing platform occurs, as is possible, for example, when traveling around bends, the support element contacts the underlying surface on the side of the inclined standing platform, that is to say on the longitudinal side facing the bend. As a result, the standing platform is supported at the side. Consequently, by means of the support elements, the risk of tipping (over) to the side is eliminated substantially completely (or is at least considerably reduced). As a result, the scooter exhibits improved safety against tilting or tilt stability compared to the prior art.

A particularly suitable electromotive scooter is realized as a result. A low-weight, flexible scooter for transporting persons, which has a reduced accident risk and consequently increased occupational safety, is consequently realized in particular. The scooter consequently enables improved logistics and an operationally safe reduction in walking times in the case of extensive grounds or building complexes, such as, for example, factory halls and factory premises and airports.

A standing platform which is wider or has a larger surface compared to the prior art is made possible by the support elements. Along with a comfortable standing surface for the user, the consequently enlarged standing platform makes possible an additional standing surface for a further user and/or a standing or storage area for the stable and operationally safe transport of objects, such as goods, cases or other luggage. The flexibility of the scooter is advantageously increased as a result.

Specifications with regard to the directions in space are given below in particular with reference to a system of coordinates for the scooter (vehicle coordinate system).

The abscissa axis (X axis) is oriented along the center axis from the rear wheels to the front wheel parallel to a longitudinal direction of the vehicle. The ordinate axis (Y axis), which is perpendicular thereto, extends in the transverse direction of the vehicle and is oriented parallel to the connecting line between the rear wheels. The substantially horizontally oriented standing platform, in this connection, is arranged in the plane (XY plane) which is spanned by the abscissa and ordinate axes. The applicate axis (Z axis), in this connection, is oriented perpendicularly to the standing platform. When the scooter is in use, the steering rod is oriented in particular approximately parallel to the applicate axis.

The transverse side of the standing platform facing the front wheel is designated below in particular as front side or front edge, the oppositely arranged transverse side of the standing platform facing the rear wheels being designated correspondingly as rear side or rear edge. The longitudinal sides of the standing platform are also designated below as side edges.

In an advantageous embodiment, the (or each) support element is positioned on the underside in each case laterally outside a tilt line which extends between the front wheel and the respective rear wheel. The tilt line, in this connection, corresponds to a tilt axis about which the scooter would tilt in the case of a lateral inclination. The support elements are arranged radially outside the two tilt lines with reference to the center axis such that the standing platform and consequently the scooter are reliably supported at the side in the case of a lateral inclination. As a result, a particularly high degree of safety against tilting is achieved.

In a suitable embodiment, the support elements, in this connection, are arranged in the region of the central front wheel or in the front region of the standing platform. By the rear wheels being spaced apart in the rear region of the standing platform and the support elements being arranged spaced apart at the front next to the front wheel, particularly good and reliable tilt protection is provided for the scooter.

In a preferred embodiment, the support elements are realized as support wheels. The support wheels, in this connection, are arranged on the front end of the standing platform preferably so as to be freely pivotable. Particularly suitable and expedient support elements, which are able to provide support in a particularly flexible manner on a respective underlying surface, are realized as a result.

In an alternative embodiment, it is, for example, also contemplated for the support elements to be realized as rollers or balls. An embodiment as rigid bulge-like or skid-like plastic parts which slide along the underlying surface whilst they are providing support is also possible. In the case of such an embodiment as rigid plastic parts, the support elements expediently have a particularly smooth and low-friction surface such that whilst they are providing support no unwanted drag or braking effect is brought about by the physical contact between the underlying surface and the support elements.

In a possible further development, the support elements are arranged behind the front wheel, offset toward the rear wheels along the center axis. As a result, the use of the scooter in the area of steps and thresholds is advantageously simplified as consequently, when traveling over the step or the threshold, the front wheel is introduced to said step or threshold first. At the same time, a high degree of tilt protection continues to be ensured such that traveling over thresholds and steps is possible in a particularly simple and safe manner.

In an expedient design, the front wheel is driven by way of the drive motor. A particularly expedient drive of the scooter is realized as a result. In this connection, it is, for example, possible for the handlebars to be provided with a rotary handle for controlling the motor output and consequently the vehicle speed in a simple manner. No further clutch or gear shift is consequently required.

In an advantageous embodiment, the drive motor is realized as a wheel hub motor of the front wheel. In other words, the electric or drive motor is installed or integrated directly in the front wheel of the scooter. A particularly expedient drive motor which does not take up much space is realized as a result.

In a particularly preferred design, the front wheel, which is arranged in particular within the feed-through aperture, is pivotable about 360° by use of the handlebars. In other words, a substantially unrestricted steering angle for the front wheel is realized as a result of the handlebars and the steering rod. On the one hand, the greatest possible maneuverability of the scooter is ensured as a result. On the other hand, it is consequently in particular possible for the scooter to be able to be moved backward even without a gear shift, that is to say the direction of travel or movement is reversed by the handlebars—and consequently the front wheel—being pivoted about 180°. A particularly suitable scooter is consequently realized.

In an expedient further development, a vehicle battery for the supply of power to the drive motor is integrated in the steering rod. The vehicle battery, which is realized, for example, as an accumulator, is consequently arranged in a particularly space-saving manner on the scooter such that, for example, additional installation space is brought about in the area of the standing platform. The integration of the vehicle battery into the steering rod, in this connection, is advantageous in particular in the case of a further development where the front wheel has a drive motor which is realized as a wheel hub motor, since consequently particularly simple cable routing, which saves on material, is realized.

In an alternative further development, the vehicle battery is integrated, for example, in the standing platform.

In a suitable realization, the steering rod is pivotable in relation to the standing platform. In other words, the steering rod is fastened to the standing platform in a foldable manner such that, where required, the scooter is able to be collapsed so as to take up little space. To this end, the steering rod is pivoted about a pivot axis which is oriented substantially parallel to the ordinate axis of the scooter. The scooter is able to be transported in a particularly compact manner and/or stored in a compact manner as a result. In a suitable embodiment, in particular the steering rod and the drive motor are consequently pivotable together.

An additional or further aspect of the invention relates to a method for operating an electromotive scooter. Generally speaking, in this connection, the method is applicable to arbitrary electromotive scooters, the scooter described above being in particular suitable and set up for this.

A pivot angle of the front wheel about the rotational axis, in particular about the steering rod, is detected according to the method. In other words, a steering angle of the scooter is detected. To this end, rotation angle sensors, for example, are integrated into the steering rod.

According to the method, a torque and/or the speed of the drive motor, that is to say the motor output, are adjusted in dependence on the detected pivot angle for controlling the vehicle speed.

A pivot angle-dependent or steering angle-dependent limitation of the torque and of the vehicle speed is consequently realized by the method according to the invention. In the case of an ever-larger steering angle, the motor output, and as a result the vehicle speed, is consequently reduced gradually or in steps such that an accident risk on account of incorrect use is avoided in an advantageous and simple manner. As a result, the scooter, for example when traveling around a tight bend—and in the case of a correspondingly large steering angle—is braked in a self-acting manner or automatically such that a tilt or accident risk is reliably reduced.

The method, in this connection, is suitable in particular for an above-described scooter with a front wheel which is pivotable about 360°. When reversing, where the front wheel is pivoted in particular about 180°, the method automatically performs control and/or regulation to a lower motor torque. As a result, approaching or accelerating too fast in an unwanted manner is counteracted, as a result of which user comfort and user safety are improved.

The scooter, in this connection, advantageously comprises a controller, that is to say a control device which is suitable and set up for carrying out the afore-described method.

The controller, in this connection, is set up in general with respect to programming and/or switching techniques to carry out the afore-described method according to the invention. The controller is consequently set up specifically for the purpose of detecting the pivot or steering angle of the scooter by use of a sensor, and for adjusting the motor torque and/or the motor speed of the drive motor by way of the angle detected.

In a preferred design, the controller is formed at least essentially by a microcontroller with a processor and with a data storage unit in which the functionality for carrying out the method according to the invention is implemented with respect to programming techniques in the form of operating software (firmware) such that the method—where applicable interacting with a motor vehicle user—is carried out automatically in the microcontroller when the operating software is executed.

However, as an alternative, the controller can also be formed within the framework of the invention by a non-programmable electronic component, for example an application-specific integrated circuit (ASIC), in which the functionality for carrying out the method according to the invention is implemented by way of switching means.

In a possible embodiment, it is, for example, contemplated for the controller to be part of the motor electronics which control and/or regulate the electric or drive motor.

In a further development, the controller comprises, for example, an interface for, in particular wireless, signaling coupling with a smart device, such as, for example, a smart phone or a tablet computer. A position sensor, such as, for example, a GPS (global positioning system) or a WLAN-based sensor, which detects the position of the scooter in the grounds or inside a building complex, is provided in particular in this connection.

In this connection, it is, for example, conceivable for different regions or zones to be determined inside the grounds or building complex, to which regions or zones a respective maximum speed value is assigned. The respective speed values, in this connection, are stored, for example, in a storage unit of the controller, the maximum torque, and consequently the maximum speed of the vehicle, being regulated by means of the position sensor in dependence on the region or the zone in which the scooter is currently situated. In other words, a user is able to travel in such a (speed) zone only at a predefined maximum or highest speed. As a result, it is possible, for example, to cause the speed of the scooter to be reduced automatically in the region of junctions and locations or loading areas with restricted visibility. For example, the maximum vehicle speed is reduced from 20 km/h to 6 km/h in this connection. As a result of said further development with speed zones, the accident risk is considerably reduced and unwanted speeding of the user is consequently avoided.

In addition or as an alternative, in a further development the scooter comprises environmental sensors, such as, for example, optical cameras or proximity sensors, for detecting the vehicle environment. The environmental sensors, in this connection, are coupled in such a manner with the controller, for example, that it controls the vehicle speed and/or the direction of movement or steering in dependence on the sensor signals. As a result, for example, the scooter is provided with driving-assistance systems, for example with a lane keeping system or the like. In particular, the scooter is suitable and set up for traveling in a self-acting or automatic manner in the grounds or in the building complex. As a result of such an autonomously movable scooter, it is possible, for example, for the scooter to move independently to frequently used locations, such as, for example, to a charging station for charging the electrical energy storage device or to a works entrance. User comfort is further improved as a result.

Other objects, advantages and novel features of the present invention will become apparent from the following detailed description of one or more preferred embodiments when considered in conjunction with the accompanying drawings.

DETAILED DESCRIPTION OF THE DRAWINGS

Parts and variables which correspond to one another are always provided with the same reference symbols in all the figures.

Figure 1:
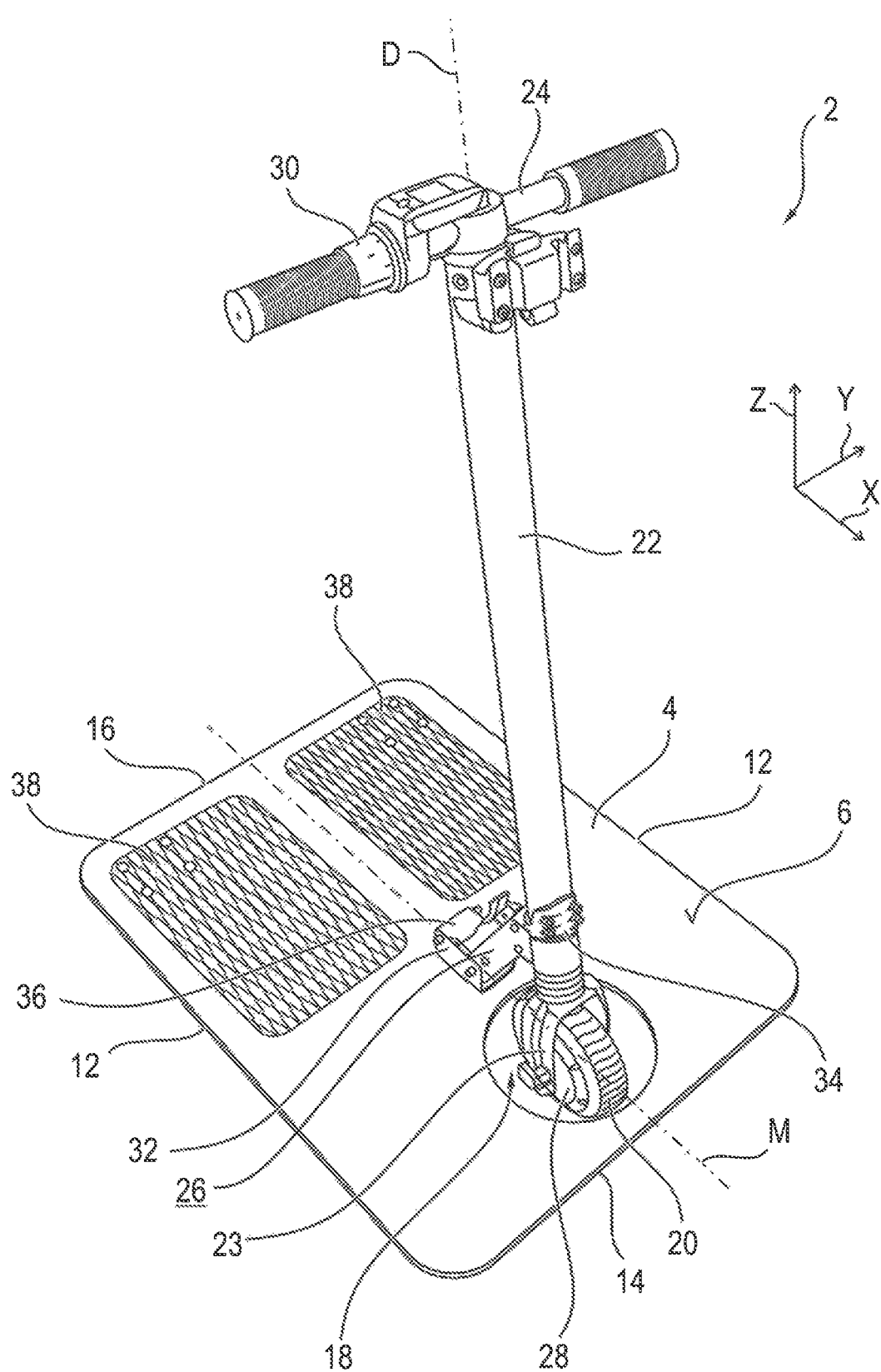
FIG. 1 is a perspective representation of an electromotive scooter.

The electromotive scooter 2 shown in FIG. 1 is suitable and set up for transporting persons, in particular in extensive grounds or in an extensive building complex, such as, for example, an airport or a factory hall. The scooter 2, in this connection, has a large-area standing platform 4 having an upper side 6 and having an underside 8 (FIG. 2) which is arranged opposite said upper side.

Figure 5:
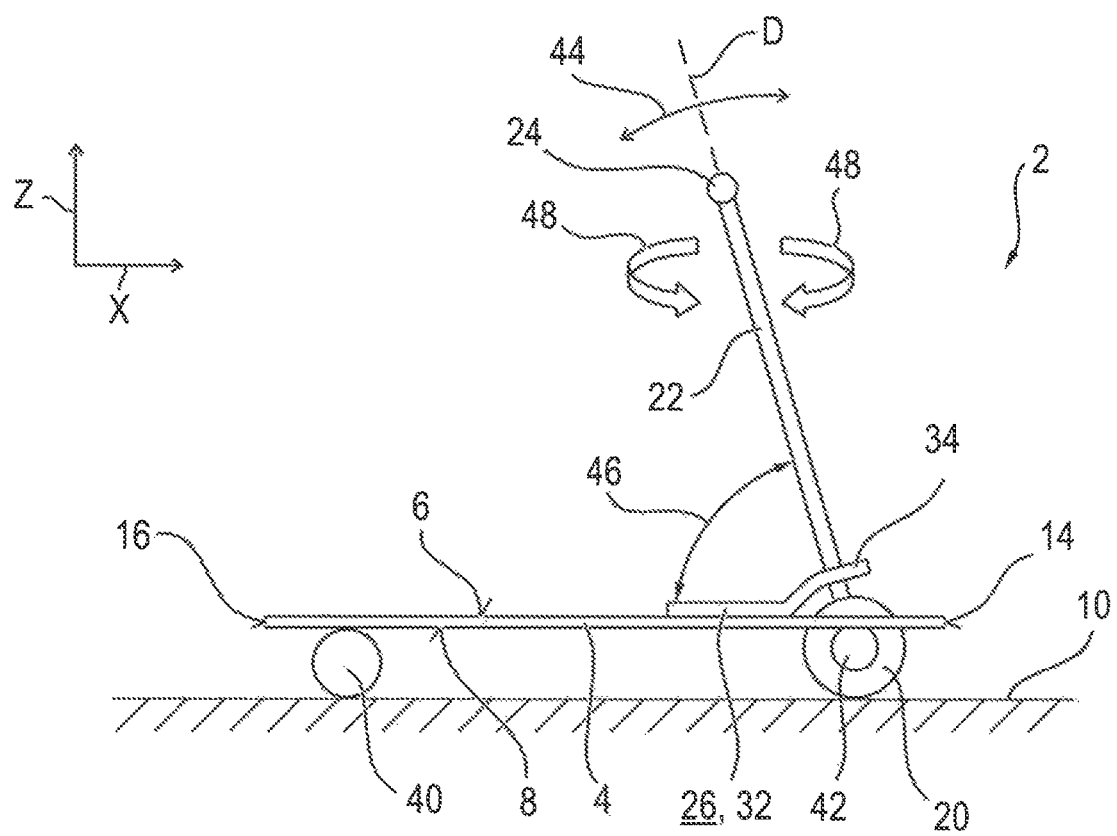
FIG. 5 is a schematic side representation of the scooter.

The standing platform 4, which is approximately rectangular in this exemplary embodiment, is arranged approximately parallel and flat with respect to an underlying surface 10 (FIG. 5). The underside 8 of the standing platform 4, in this connection, faces the underlying surface 10. The standing platform 4 has two longitudinal sides or side edges 12 and two transverse sides 14 and 16 which are oriented perpendicularly thereto. In this connection, the transverse sides 14, 16 have a length which is less than that of the longitudinal sides 12. The front-side transverse side 14 of the scooter 2 is also designated below as front side or front edge 14. The transverse side 16 which is arranged opposite said front-side transverse side is also correspondingly designated as rear side or rear edge 16.

Specifications with regard to the directions in space are given below in particular in a system of coordinates for the scooter (vehicle coordinate system).

The abscissa axis X is oriented parallel to a longitudinal direction of the vehicle, that is to say parallel to the longitudinal sides and extends from the rear edge 16 to the front edge 14. The ordinate axis Y, which is perpendicular thereto, extends in the transverse direction of the vehicle and is oriented parallel to the transverse sides 14 and 16. The applicate axis Z, in this connection, is oriented perpendicularly to the standing platform 4.

The standing platform 4 comprises as the axis of symmetry a center axis M which extends parallel to the longitudinal sides 12. A feed-through aperture 18, which is completely closed circumferentially, is incorporated into the standing platform 4 in the region of the front edge 14. The approximately circular feed-through aperture 18 is arranged on the center axis M and is incorporated into the standing platform 4 as an approximately hole-like recess.

In the exemplary embodiment in FIG. 1, a front wheel 20 of the scooter 2 is arranged within the feed-through aperture 18. The front wheel 20, in this connection, sits in particular in such a manner in the feed-through aperture 18 that the front wheel 20 projects at least in part both from the upper side 6 and the underside 8 of the standing platform 4.

The front wheel 20 of the scooter 2 is consequently not arranged in a free-standing manner on the standing platform 4 but is incorporated into the standing platform 4 itself. The central front wheel 20 is protected by the surrounding standing plate 4 by way of the feed-through aperture 18 such that, in the event of an impact against an obstacle, the forces that arise do not act in particular on the front wheel 20. As a result, the stability of a user in an impact is improved such that particularly safe operation of the scooter 2 is ensured.

The front wheel 20 is coupled mechanically with a steering rod (steering column) 22. To this end, the steering rod 22 has a sprung or damped wheel fork 23, by which the front wheel 20 is surrounded so as to be rotatable. The steering rod 22, in this connection, is provided with handlebars 24 on a (rod) end located opposite the front wheel 20. In the region of the wheel fork 23, that is to say on a (rod) end facing the front wheel 20, the steering rod 22 is fastened on the upper side 6 of the standing platform 4 by way of a mounting 26. The steering rod 22, in this connection, is rotatably mounted via the mounting 26 such that as a result of pivoting the handlebars 24 about a rotational axis D which is formed by the steering rod 22, the front wheel 20 is also pivoted or guided about a corresponding pivot or steering angle.

The front wheel 20 is driven or drivable by an electric drive motor or electric motor 28. The drive motor 28, in this connection, is realized as a wheel hub motor, and as such is integrated at least in part into the front wheel 20 of the scooter 2. In the exemplary embodiment in FIG. 1, a vehicle battery in the form of an accumulator, which is not shown in any detail, is integrated in the steering rod 22. The handlebars 24 have a rotary handle 30 for controlling and adjusting the motor output (torque, speed) and consequently the vehicle speed.

The steering rod 22 and consequently the front wheel 20 and the handlebars 24 are held by the mounting 26 so as to be pivotable in relation to the standing platform 4. The mounting 26 includes, in this connection, a fastening plate 32, which is fastened rigidly on the standing platform 4 with a retaining arm 34 which is pivotable in relation to said fastening plate and encompasses or surrounds the steering rod 22 in a positive-locking manner.

With the steering rod 22 in the upright position shown in FIG. 1, the retaining arm 34 is lockable so as to be releasable by means of a foot pedal 36. When the foot pedal 36 is activated, the locking is released, as a result of which the retaining arm 34 is pivotable or tiltable in relation to the fastening plate 32 such that the steering rod 22 is positionable in a substantially flat manner along the center axis M on the upper side 6 of the standing platform 4. As a result, the scooter 2 is able to be transported in particular in a manner that does not take up too much space and/or stored in a manner that does not take up too much space.

In the region of the rear edge 16, the upper side 6, which is also designated below as the standing surface, has two rectangular foot mats 38. When the scooter is in use, a user, in this connection, preferably places in each case one of his feet on in each case one of the foot mats 38. The foot mats 38 are produced from a rubber material and comprise a diamond-like (standing) profile for improving the stability of the user.

Figure 2:
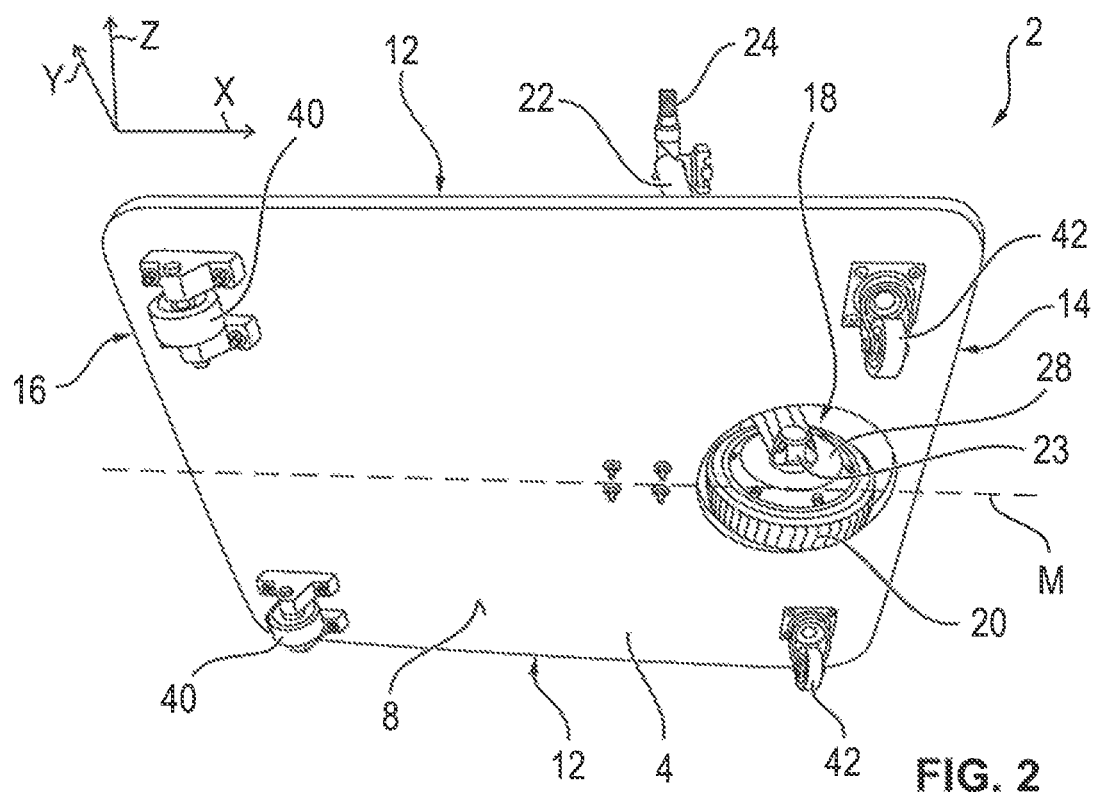
FIG. 2 is a perspective representation of an underside of the scooter.
Figure 3:
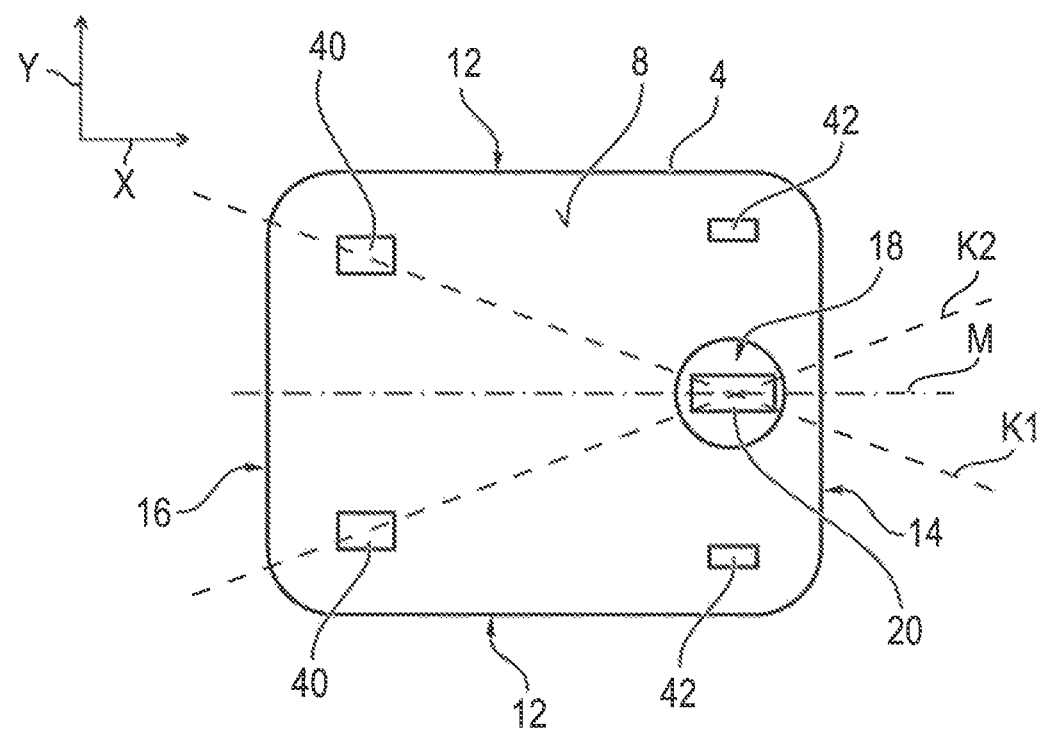
FIG. 3 is a schematic top view of the underside of the scooter.
Figure 4:
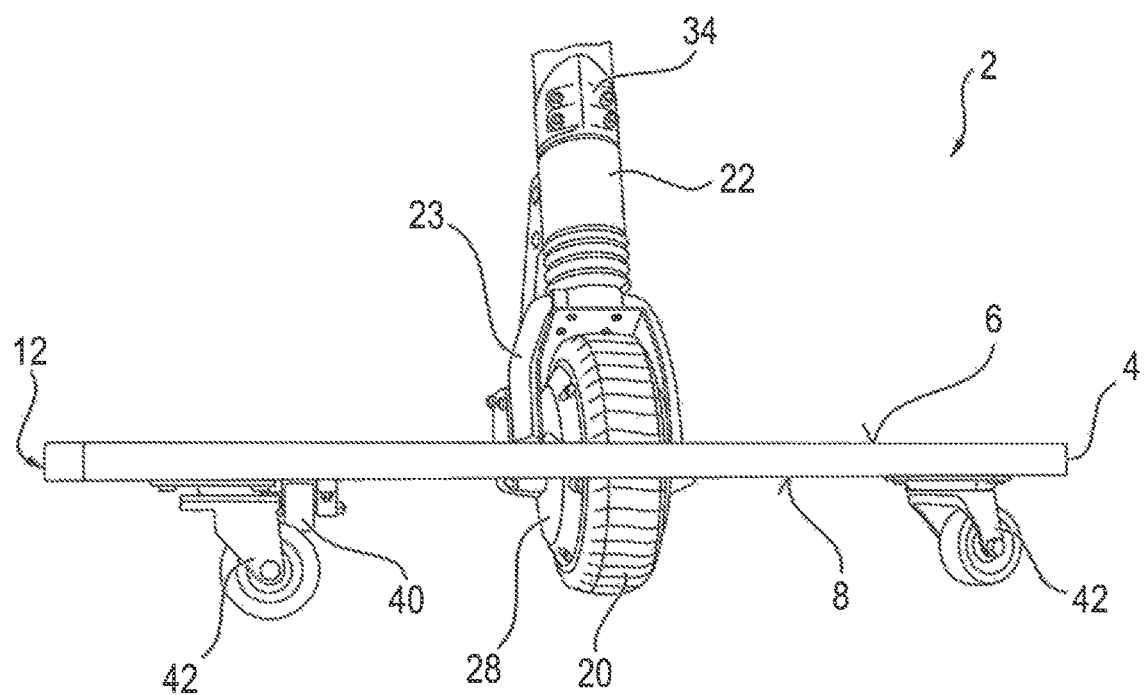
FIG. 4 is a perspective representation of the scooter viewed from a front side.

As can be seen in the representations in FIG. 2 and FIG. 3, the standing platform 4 has two rear wheels 40 on the underside 8. The rear wheels 40, in this connection, comprise—as can be seen in particular in the representations in FIG. 4 and FIG. 5—a reduced wheel diameter compared to the front wheel 20. The rear wheels 40, in this connection, are positioned on the underside 8, offset toward the rear edge 16 in relation to the front wheel 20 along the abscissa axis X. The rear wheels 40 are additionally arranged offset along the ordinate axis Y to the side of the center axis M.

In the exemplary embodiment shown, the front wheel 20 is realized, for example, with a pneumatic tire, the rear wheels 40 being realized in particular as hard rubber wheels.

As can be seen in particular in FIG. 3, the front wheel 20 and the rear wheels 40, in this connection, form the corners of an isosceles triangle, the center axis M forming the axis of symmetry of the triangle. The leg sides of the triangle, that is to say the connecting lines between the front wheel 20 and the respective rear wheel 40, form, in this connection, in each case a tilt axis K1, K2 about which the scooter 2 can tip over.

To improve the tilt safety and to reduce the accident risk, the scooter 2 includes two support elements 42 which are realized as support wheels. The substantially freely pivotable support wheels 42, in this connection, project from the underside 8 of the standing platform 4 and are arranged flanking the front wheel 20 to the side. As can be seen in particular in the schematic and simplified representation in FIG. 3, the support wheels 42, in this connection, are arranged in particular in each case laterally outside the respective tilt line K1 and K2. In other words, the support wheels 42 are arranged radially outside the tilt lines K1 and K2 with reference to the center axis M such that the standing platform 4 is reliably supported at the side in the event of lateral inclination.

The front wheel 20 and the two rear wheels 40 carry the standing platform 4 and, when the scooter 2 is in use, are situated substantially at any point in time in physical contact with the underlying surface 10. The support wheels 42 comprise a shorter axial height on the underside 8 compared to the front wheel 20 and the rear wheels 40. In other words, the support wheels 42 do not contact the underlying surface 10 in a substantial manner. If the standing platform 4 experiences a certain degree of lateral inclination, with reference to the abscissa axis X or to the center axis M, as is possible, for example, when the scooter 2 travels around a bend, the support wheel 42 on the inclined side of the standing platform, that is to say on the longitudinal side 12 facing the bend, contacts the underlying surface 10. As a result, the standing platform is supported at the side and is reliably protected from tipping over along the tilt lines K1 or K2.

In the schematic and simplified side representation in FIG. 5, the pivotability or tiltability of the steering rod 22 or of the retaining arm 34 about a pivot axis of the mounting 26, which is oriented parallel to the ordinate axis Y, is shown schematically by means of a double arrow 44. As can be seen in the side representation, the steering rod 22 is approximately parallel to the applicate axis Z in the upright position and is at an acute angle of inclination 46, that is to say at an angle of less than 90°, in relation to the standing platform 4.

The pivotability about the rotational axis D, which is realized by the steering rod 22, is shown in FIG. 5 by means of two curved arrows 48. The arrows 48 are also designated below, in this connection, as pivot angles or steering angles. The front wheel 20, in this connection, is pivotable in particular by 360° around the rotational axis D. In other words, the steering rod 22 is fastened in such a manner on the retaining arm 34 that full angle rotation of the steering rod 22 and consequently of the front wheel 20 is possible. This means that a substantially unrestricted steering angle 48 is realizable for the front wheel 20 by way of the handlebars 24 such that the scooter 2 is particularly maneuverable.

The afore-described scooter 2 is suitable and set up in particular for carrying out a method according to the invention. The method described below, however, is also transferable to different scooters.

The steering angle 48 of the front wheel 20 about the rotational axis D, that is to say about the steering rod 22, is detected, in this connection, according to the method. Rotation sensors, for example, are integrated into the steering rod 22 for this purpose. According to the method, the torque and/or the speed of the drive motor 28, that is to say the motor output, is adjusted in dependence on the detected steering angle 48 for controlling the speed of the vehicle. As a result, the torque and the speed of the vehicle are restricted in dependence on the steering angle. In the event of an ever-increasing steering angle 48, the motor output, and as a result the speed of the vehicle, is consequently reduced gradually or in steps.

When reversing, where the front wheel 20 is pivoted about 180°, the method automatically switches and/or regulates to a lower motor torque. As a result, approaching or accelerating too fast is counteracted, as a result of which user comfort and user safety are improved.

Figure 6:
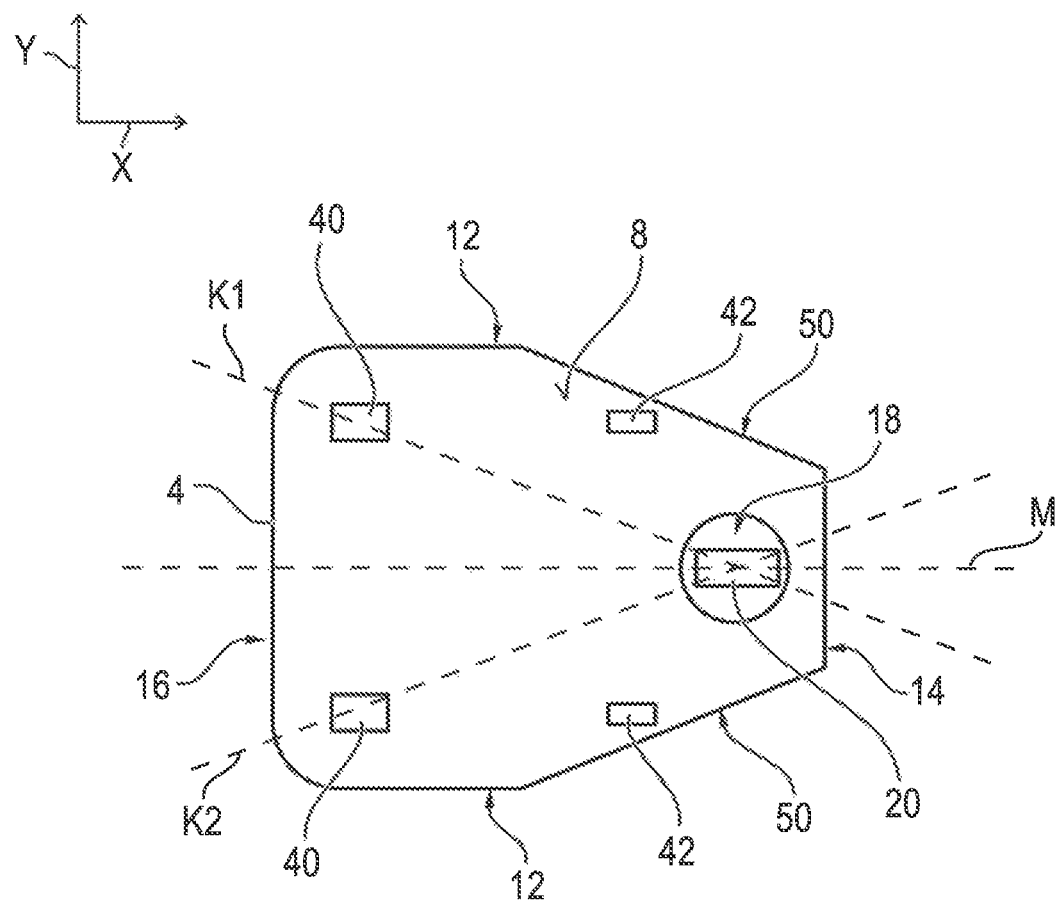
FIG. 6 is a schematic top view of an alternative embodiment of the underside of the scooter.

The schematic and simplified top view in FIG. 6 shows an alternative embodiment of the scooter 2. In this embodiment, the standing platform 4 has an approximately hexagonal cross-sectional form in the XY plane shown. The front edge 14, in this connection, comprises a shortened side length compared to the rear edge 16. The front edge 14 opens out, in this connection, into two bevels 50 which are inclined in relation to the center axis M or to the abscissa axis X and extend from the front edge 14 to the respective side edge 12. The side edges 12 extend, in this connection, from the rear edge 16 to approximately the level of a center of the vehicle which is arranged centrally between the front edge 14 and the rear edge 16 along the center axis M, and there merge into the respective bevels 50. As a result, the scooter 2 in said embodiment has a narrower vehicle front side which is approximately trapezoidal in cross section.

In said embodiment, the support wheels or support elements 42 are arranged behind the front wheel 20, offset toward the rear wheels 40 along the center axis M. The support elements 42, in this connection, are also arranged offset to the side of the center axis M and outside the respective tilt line K1, K2. As a result of said arrangement of the support elements 42 behind the front wheel 20, the use of the scooter 2 in the region of steps and thresholds is advantageously simplified, since consequently when the step or the threshold is traveled over, the front wheel 20 is introduced to said step or threshold first.

The invention is not restricted to the above-described exemplary embodiment. On the contrary, other variants of the invention are also able to be derived from this by the expert without departing from the object of the invention. In particular, all the individual features described in conjunction with the exemplary embodiment are also additionally combinable with one another in another manner without departing from the object of the invention.

LIST OF REFERENCES

2 Scooter
4 Standing platform
6 Upper side/standing surface
8 Underside
10 Underlying surface
12 Longitudinal side/side edge
14 Transverse side/front edge/front side 16 Transverse side/rear edge/rear side
18 Feed-through aperture
20 Front wheel
22 Steering rod
23 Wheel fork
24 Handlebars
26 Mounting
28 Drive motor
30 Rotary handle
32 Fastening plate
34 Retaining arm
36 Foot pedal
38 Foot mat
40 Rear wheel
42 Support element/support wheel
44 Double arrow
46 Angle of inclination
48 Arrow/pivot angle/steering angle
50 Bevel
M Center axis
D Rotational axis
X Abscissa axis
Y Ordinate axis
Z Applicate axis
K1, K2 Tilt axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A scooter for transporting persons, comprising:
an electric drive motor;
a standing platform;
a front wheel which is arranged along a center axis of the standing platform;
a steering rod coupled to the front wheel at a first end of the steering rod;
handlebars for pivoting the front wheel about a rotational axis which is formed by the steering rod, wherein the handlebars are connected to the steering rod at second end of the steering rod and wherein the second end is located opposite the first end and the front wheel; and
two rear wheels which are at a spacing from the front wheel and are each arranged laterally offset with respect to the center axis, wherein
the standing platform is a flat surface, a region of a rear edge of an upper side of the flat surface has a foot mat, and the two rear wheels project from an underside of the flat surface that faces an underlying surface,
a feed-through aperture, which is completely closed circumferentially and is passed through by the steering rod, or in which the front wheel sits, is incorporated into the standing platform as a recess defined by the standing platform, and
at least one support element arranged on each side of the front wheel projects from the underside of the standing platform that faces the underlying surface.

2. The scooter as claimed in claim 1, wherein
the support elements are positioned on the underside in each case laterally outside a tilt line which extends between the front wheel and a respective rear wheel.

3. The scooter as claimed in claim 2, wherein
the support elements are support wheels.

4. The scooter as claimed in claim 1, wherein
the support elements are arranged behind the front wheel, offset toward the rear wheels along the center axis.

5. The scooter as claimed in claim 1, wherein
the front wheel is driven by the electric drive motor.

6. The scooter as claimed in claim 5, wherein
the electric drive motor is a wheel hub motor of the front wheel.

7. A scooter for transporting persons, comprising:
an electric drive motor;
a standing platform;
a front wheel which is arranged along a center axis of the standing platform;
a steering rod coupled to the front wheel;
handlebars for pivoting the front wheel about a rotational axis which is formed by the steering rod; and
two rear wheels which are at a spacing from the front wheel and are each arranged laterally offset with respect to the center axis, wherein
a feed-through aperture, which is completely closed circumferentially and is passed through by the steering rod, or in which the front wheel sits, is incorporated into the standing platform,
at least one support element arranged on each side of the front wheel projects from an underside of the standing platform that faces an underlying surface, and
the front wheel, which is arranged within the feed-through aperture, is pivotable about 360° by way of the handlebars.

8. A scooter for transporting persons, comprising:
an electric drive motor;
a standing platform;
a front wheel which is arranged along a center axis of the standing platform;
a steering rod coupled to the front wheel;
handlebars for pivoting the front wheel about a rotational axis which is formed by the steering rod;
two rear wheels which are at a spacing from the front wheel and are each arranged laterally offset with respect to the center axis, wherein
a feed-through aperture, which is completely closed circumferentially and is passed through by the steering rod, or in which the front wheel sits, is incorporated into the standing platform, and
at least one support element arranged on each side of the front wheel projects from an underside of the standing platform that faces an underlying surface; and
a vehicle battery integrated in the steering rod for power supply of the electric drive motor.

9. The scooter as claimed in claim 1, wherein
the steering rod is pivotable in relation to the standing platform.

* * * * *